(12) United States Patent
Hsu et al.

(10) Patent No.: US 8,770,538 B2
(45) Date of Patent: Jul. 8, 2014

(54) SUPPORTING STRUCTURE FOR ELECTRONIC DEVICE

(75) Inventors: An Szu Hsu, New Taipei (TW); Chien Cheng Mai, New Taipei (TW); Way Han Dai, New Taipei (TW)

(73) Assignee: First Dome Corporation, New Taipei (TW)

( * ) Notice: Subject to any disclaimer, the term of this patent is extended or adjusted under 35 U.S.C. 154(b) by 0 days.

(21) Appl. No.: 13/362,054

(22) Filed: Jan. 31, 2012

(65) Prior Publication Data
US 2013/0193292 A1 Aug. 1, 2013

(51) Int. Cl.
*A47G 29/00* (2006.01)
*F16M 11/00* (2006.01)

(52) U.S. Cl.
USPC ............... 248/685; 361/679.09; 361/679.15; 248/463; 248/461; 248/462

(58) Field of Classification Search
USPC ......... 248/917–924, 460, 461, 462, 463, 682, 248/685, 454, 455; 361/679.15, 679.12, 361/679.09, 679.02, 679.06, 679.08
See application file for complete search history.

(56) References Cited

U.S. PATENT DOCUMENTS

| | | | | |
|---|---|---|---|---|
| 5,085,394 A | * | 2/1992 | Torii | 248/455 |
| 5,168,426 A | * | 12/1992 | Hoving et al. | 361/679.09 |
| 5,345,362 A | * | 9/1994 | Winkler | 361/679.06 |
| 6,714,408 B1 | * | 3/2004 | Wang et al. | 361/679.09 |
| 6,816,365 B2 | * | 11/2004 | Hill et al. | 361/679.44 |
| 6,903,927 B2 | * | 6/2005 | Anlauff | 361/679.28 |
| 7,065,835 B2 | * | 6/2006 | Kuramochi | 16/357 |
| 7,107,084 B2 | * | 9/2006 | Duarte et al. | 455/575.3 |
| 7,184,263 B1 | * | 2/2007 | Maskatia | 361/679.27 |
| 7,239,505 B2 | * | 7/2007 | Keely et al. | 361/679.09 |
| 7,586,743 B2 | * | 9/2009 | Lin | 361/679.55 |
| 7,907,393 B2 | * | 3/2011 | Sellers | 361/679.27 |
| 8,199,475 B2 | * | 6/2012 | Yeh et al. | 361/679.27 |
| 8,243,213 B2 | * | 8/2012 | Chen et al. | 348/836 |
| 8,248,788 B2 | * | 8/2012 | Wu et al. | 361/679.55 |
| 8,249,676 B2 | * | 8/2012 | Ladouceur et al. | 455/575.4 |
| 2004/0057197 A1 | * | 3/2004 | Hill et al. | 361/683 |
| 2004/0062000 A1 | * | 4/2004 | Duarte | 361/683 |
| 2012/0176738 A1 | * | 7/2012 | Wei | 361/679.01 |
| 2012/0236476 A1 | * | 9/2012 | Wu et al. | 361/679.01 |
| 2012/0307441 A1 | * | 12/2012 | Hung et al. | 361/679.09 |

* cited by examiner

*Primary Examiner* — Nkeisha Smith
(74) *Attorney, Agent, or Firm* — Rosenberg, Klein & Lee

(57) ABSTRACT

A supporting structure for an electronic device is provided to reduce the thickness or volume of device structures in conventional skills. The supporting structure includes a connecting arm having a first end and a second end which are substantially pivoted to a side region of a sliding and/or rotating module and an edge portion of a substrate module, respectively. With the connecting arm being rotated in response to the movement of the sliding and/or rotating module, the rotation or combination type can be provided between the first and second ends of the connecting arm and the side regions of the sliding and/or rotating module and the edge portion of the substrate module, thereby improving difficulties of the internal structure and design of the assembly of conventional supporting structure and electronic device.

2 Claims, 5 Drawing Sheets

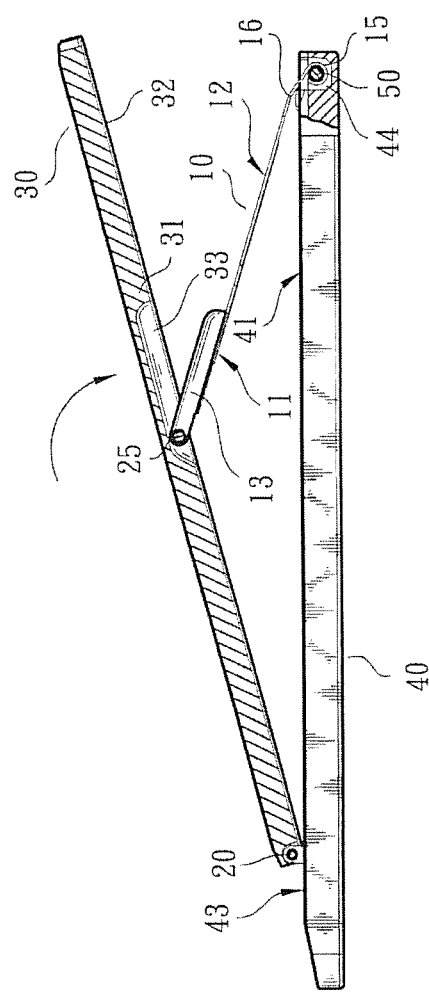
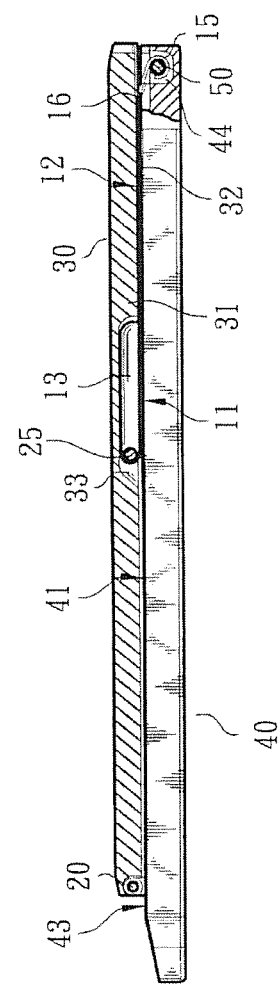

SUPPORTING STRUCTURE FOR ELECTRONIC DEVICE

BACKGROUND OF THE INVENTION

1. Field of the Invention

The present invention relates to a supporting structure for an electronic device, and in particular relates to a connecting arm of a supporting structure to be disposed on side regions and edge portion of an electronic device to obtain excellent space utilization therein.

2. Description of the Related Art

Electronic devices, such as mobile phones, laptops, personal digital assistants, digital cameras and E-books, are incorporated with sliding-cover and/or rotary-shaft systems which are reciprocally moved or freely rotated by external force, so that sliding-cover modules or sliding modules (e.g., monitors) of these conventional electronic devices can be generally slid and rotated for opening or closing.

Such sliding-cover modules or parts, which are often incorporated with a combination of a sliding rail, moving modules and a rotational assembly provided with a rotary ring and means for storing and releasing the energy in and from elastic ring, elastic fasteners or springs, are capable of being moved and overturned for opening, closing, rotating and operational angle adjustment. However, due to the shakiness problem and two-section sliding and rotation operation, it is difficult for such sliding-cover modules to be provided and positioned for a user to perform touch-controlling functions.

Conventional sliding-cover modules or monitors incorporated with three- or four-linkage mechanism for supporting are disclosed, capable of providing supports to the back of the sliding-cover module or monitor and performing touch-controlling functions by a user. However, the operational angle of such sliding-cover module or monitor incorporated with the linkage mechanism cannot be adjusted, and the monitor can be lifted to an operational position by applying large forces to pull the monitor and linkage mechanism.

In view of the above-described inconveniences, included of positioning the monitor to the operational position for performing touch-controlling functions in the two-section sliding and rotation operation, or of applying large forces on the monitor and linkage mechanism to lift the monitor to the operational position for the user to perform touch-controlling functions, a conventional method is therefore provided, capable of simultaneously lifting and rotating the sliding-cover module or the monitor to the operational position when the user pushes the sliding-cover module or the monitor. In such cited arts, a supporting member which is disposed between a sliding-cover module and a substrate module (or a fixed machine body) includes two ends respectively pivoted to the back zone of the sliding-cover module and the substrate module, and one end of the sliding-cover module is assembled to a sliding rail of the substrate module. When the sliding-cover module is moved along the sliding rail of the substrate module, the sliding-cover module also lifts the supporting member, so that the sliding-cover module supported by the supporting member can be obtained.

In the above-described conventional arts, the whole thickness or volume of the electronic device is often enlarged when the supporting member is disposed between the back zone of the sliding-cover module and the substrate module. For obtaining a light and slim electronic device, the whole thickness or volume of the electronic device must be reduced by providing concave compartments on the sliding-cover module and the substrate module to receive the supporting member and the pivotal structure. However, as known by those who skilled in this art, the internal structure and arrangement of the electronic device must be influenced or even difficult if the concave compartments are disposed on the sliding-cover module and the substrate module, especially for the components and parts taken large spaces and parts such as main boards or circuit boards, hard drives, battery components, memory units, trumpets, universal serial bus (USB) ports, parallel ports, video graphic array (VGA) cards, external power interfaces, etc.

Representatively speaking, these reference data reveal the utilizations and structural designs related to the sliding-cover modules or the incorporated components thereof. For altering the use pattern of the sliding-cover modules to be different from the conventional arts, the structures of the sliding-cover modules or the incorporated components and the above-described application shall be redesigned and reconsidered. For example, by disposing the supporting mechanism in between the back zone of the sliding-cover module and the substrate module and reducing the whole thickness or volume of the electronic device to achieve a light and slim electronic device, or by providing excellent internal structure arrangement to reduce the difficulties when the concave compartments are disposed on the sliding-cover module and the substrate module.

However, these topics are not physically taught or disclosed in the reference data above.

BRIEF SUMMARY OF THE INVENTION

In view of this, the main purpose of the present invention is to provide a supporting structure for an electronic device, capable of reducing the thickness or volume of device structures in conventional skills. The supporting structure includes a connecting arm having a first end and a second end which are substantially pivoted to a side region of a sliding and/or rotating module and an edge portion of a substrate module (or a fixed machine body), respectively. With the connecting arm being rotated in response to the movement of the sliding and/or rotating module, the rotation or combination type can be provided between the first and second ends of the connecting arm and the side regions of the sliding and/or rotating module and the edge portion of the substrate module (or a fixed machine body), thereby improving difficulties of the internal structure and design of the assembly of conventional supporting structure and electronic device.

According to a supporting structure for an electronic device of the present invention, the connecting portion is provided with a bolt hole incorporated with a fastener, thereby pivoting the connecting portion of the connecting arm to the side region of the sliding and/or rotating module. The side region of the sliding and/or rotating module is provided with a slot compartment corresponding to the connecting portion. When the sliding and/or rotating module is assembled to the substrate module (or a fixed machine body), the connecting portions provided on the first ends of the connecting arm are allowed to respectively enter into the slot compartments of the sliding and/or rotating module.

According to a supporting structure for an electronic device of the present invention, the second end of the connecting arm is provided with a pivotal portion which is pivoted to the edge portion of the substrate module or a fixed machine body by incorporating with a fastener, so that the connecting arm of being freely rotated is formed. The edge portion of the substrate module or the fixed machine body is provided with a concave compartment which is corresponding to the pivotal portion and utilized to receive the pivotal portion therein.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein:

FIG. 5 is a schematic view of another operating embodiment of the present invention, wherein a condition of a connecting arm in response to the movement of a sliding and/or rotating module is illustrated;

FIG. 6 is a schematic view of yet another operating embodiment of the present invention, wherein a condition of a sliding and/or rotating module being covered on a substrate module and a connecting portion of the connecting arm being received in a slot compartment of the sliding and/or rotating module are illustrated.

DETAILED DESCRIPTION OF THE INVENTION

Figure 1:
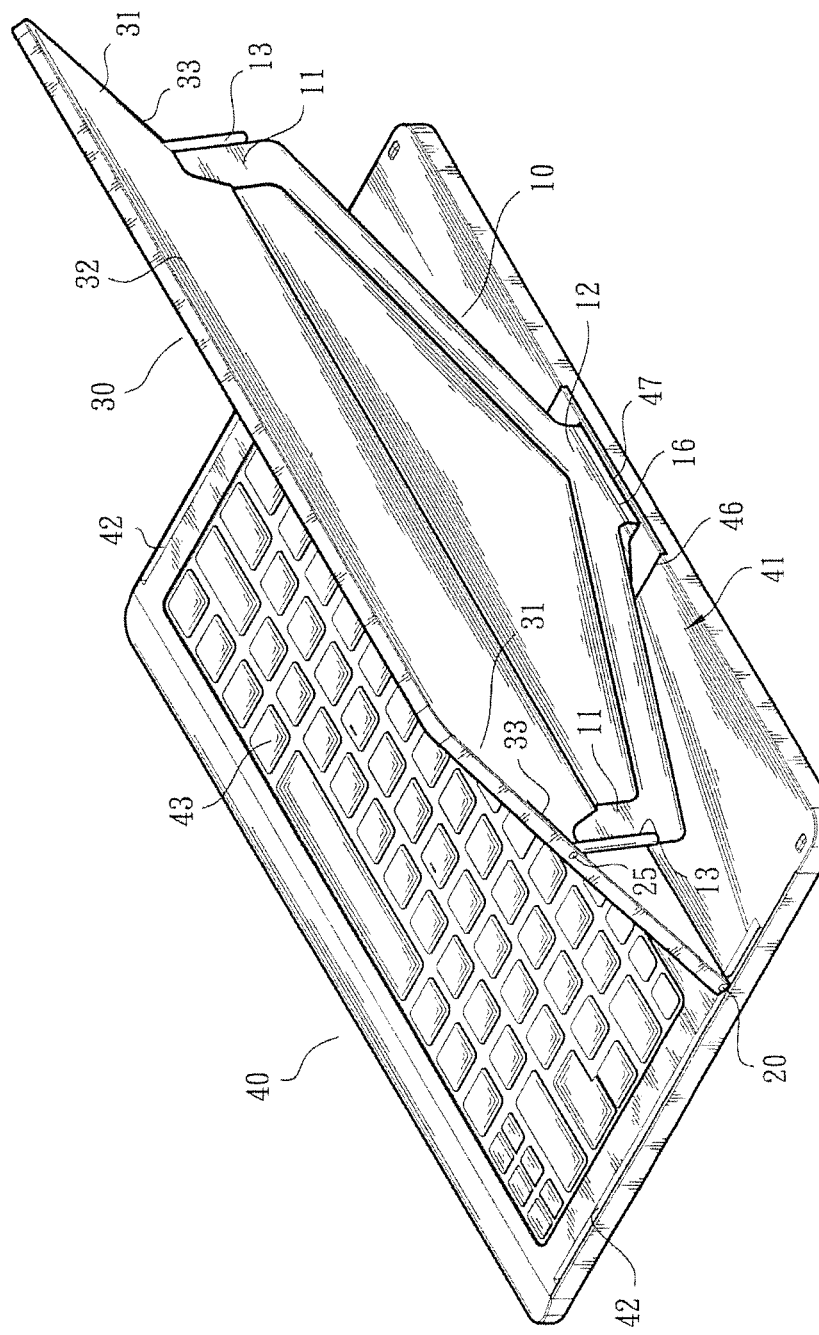
FIG. 1 is a schematic perspective view of an embodiment of the present invention, wherein a connecting arm utilized to support a sliding and/or rotating module is illustrated.
Figure 2:
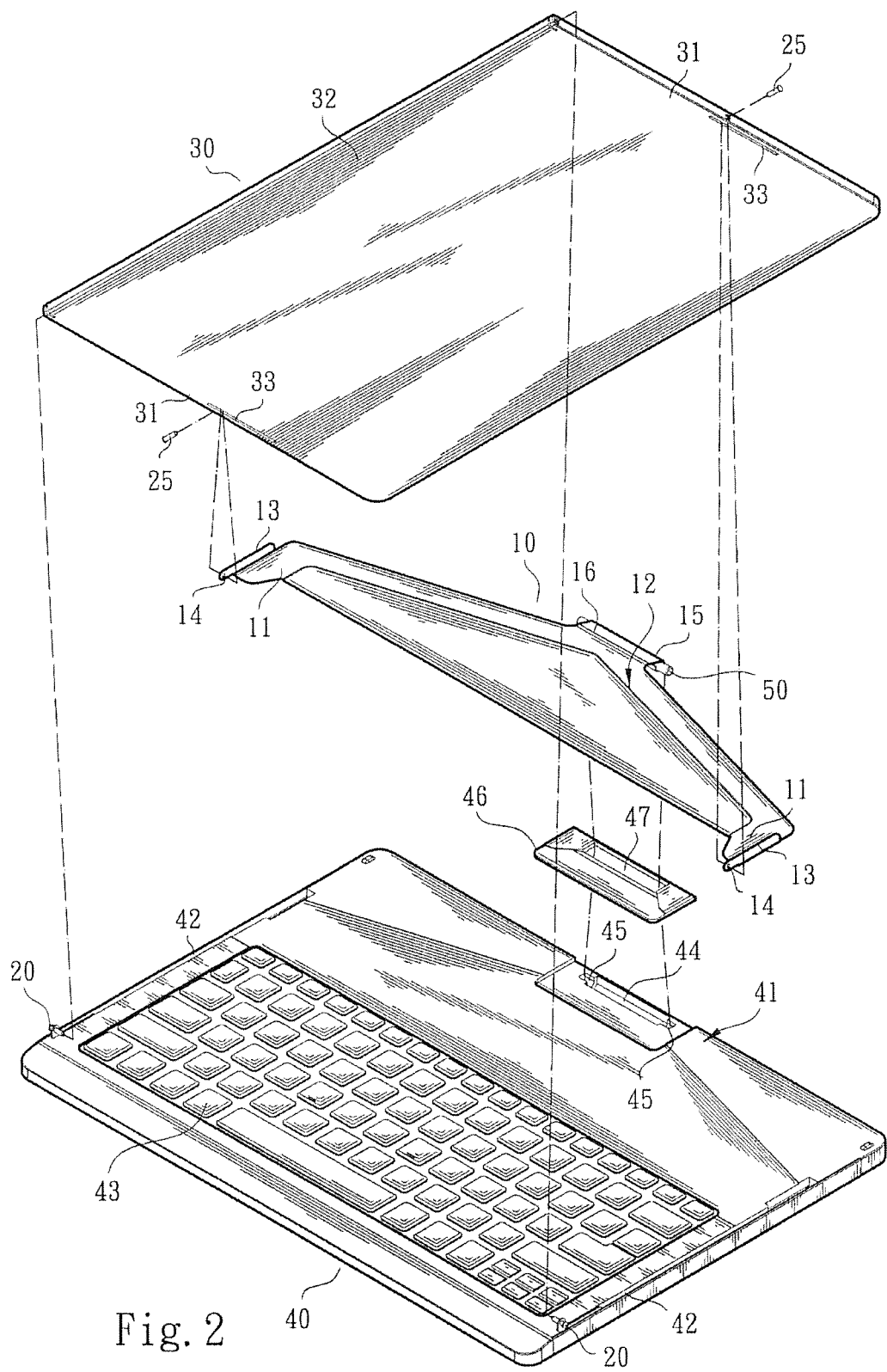
FIG. 2 is a schematic exploded view of the structure in FIG. 1, wherein the arrangement relationship of a connecting arm, a sliding and/or rotating module and a substrate module (or related components) is illustrated.

Referring to FIGS. 1 and 2, a supporting structure for an electronic device comprises a connecting arm 10, generally indicated at 10. The connecting arm 10 formed by a plate type comprises two first ends 11 and a second end 12, wherein the first ends 11 are formed by a bilateral-symmetry type. In an adopted embodiment, the connecting arm 10 is assembled to a sliding and/or rotating module 30 (e.g., sliding covers, monitors) and a substrate module 40 (or a fixed machine body) of the electronic device as illustrated in FIGS. 1 and 2.

As illustrate in FIGS. 1 and 2, the substrate module 40 comprises two sides respectively provided with rails 42, and the sliding and/or rotating module 30 comprises two sides respectively incorporated with pivotal shafts 20 correspondingly coupled to the rails 42, so that the sliding and/or rotating module 30 can be slidably and rotatably moved on the substrate module 40. The rail 42 is defined with a starting point and a terminal point. The sliding and/or rotating module 30 comprises a back 32, two sides, and side regions 31 formed on the back 32 and respectively located at two sides. The substrate module 40 comprises two sides, an edge portion 41 and an operating zone 43, wherein the operating zone 43 is located at one side, and the edge portion 41 is disposed at a middle position located on the other side.

In a preferred embodiment, the connecting arm 10 has the first end 11 pivoted to the side region 31 of the sliding and/or rotating module 30 and the second end 12 pivoted to the edge portion 41 of the substrate module 40. Concretely speaking, the first end 11 of the connecting arm 10 is provided with a connecting portion 13 which is formed by a sheet type perpendicularly projected from the connecting arm 10 (or the first end 11 thereof).

In the adopted embodiment, the connecting portion 13 is provided with a bolt hole 14 incorporated with a fastener 25, thereby pivoting the connecting portion 13 of the connecting arm 10 to the side region 31 of the sliding and/or rotating module 30. The side region 31 of the sliding and/or rotating module 30 is provided with a slot compartment 33 corresponding to the connecting portion 13. When the sliding and/or rotating module 30 is assembled to the substrate module 40, the connecting portions 13 provided on the first ends 11 of the connecting arm 10 are allowed to respectively enter into the slot compartments 33 of the sliding and/or rotating module 30, as described in more detail below.

As illustrated in FIGS. 1 and 2, the second end 12 of the connecting arm 10 is provided with a pivotal portion 15 which is pivoted to the edge portion 41 of the substrate module 40 by incorporating with a fastener or a rotary shaft 50, so that the connecting arm 10 of being freely rotated is formed. The edge portion 41 of the substrate module 40 is provided with a concave compartment 44 which is corresponding to the pivotal portion 15 of the connecting arm 10 and utilized to receive the pivotal portion 15 and the rotary shaft 50 therein.

Figure 3:
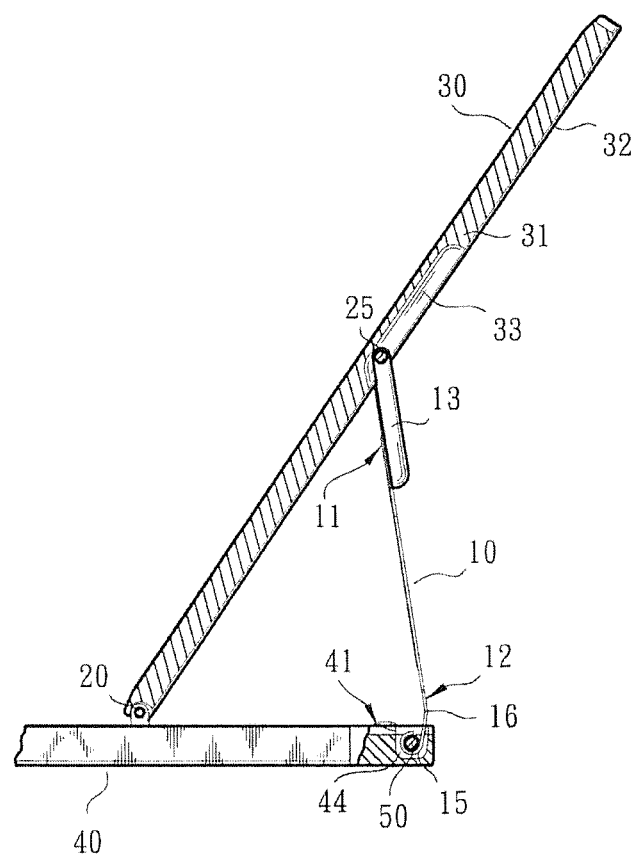
FIG. 3 is a schematic cross-sectional view of the structure in FIG. 1, wherein the configuration of a pivotal shaft located at a terminal point of a rail and a sliding and/or rotating module supported by a connecting arm are illustrated.

Specifically speaking, two sides of the concave compartment 44 of the substrate module 40 are provided with slot pockets 45 which are utilized to receive the two ends of the rotary shaft 50, and the concave compartment 44 and the slot pockets 45 of the substrate module 40 are enclosed by a cover 46 provided with an opening 47 through which the second end 12 of the connecting arm 10 is extended. With the rotary shaft 50 taking the slot pockets 45 of the substrate module 40 as pivots, the connecting arm 10 can be freely rotated in response to the movement of the sliding and/or rotating module 30. As illustrated in FIGS. 2 and 3, a bent portion 16 is formed between the pivotal portion 15 and the connecting arm 10 (or the second end 12 thereof), so that the movement of the connecting arm 10 (or the second end 12 thereof) is not interfered by the opening 47 of the cover 46.

In the embodiment of FIGS. 1 and 2, it is particularly illustrated that the connecting arm 10 has a Y-shaped form comprising two first ends 11 formed by a bifurcated type and a cooperating second end 12 (or the pivotal portion 15) provided for the two first ends 11.

Referring to FIG. 3, the sliding and/or rotating module 30 situated in an operating position (e.g., for a user to perform touch-controlling functions or to operate a keyboard or the operating zone 43) is illustrated. In FIG. 3, the pivotal shaft 20 is located at the terminal point of the rail 42, and the sliding and/or rotating module 30 is stably supported by a connecting arm 10, thus the sliding and/or rotating module 30 is particularly suitable for the user to perform touch-controlling functions.

Figure 4:
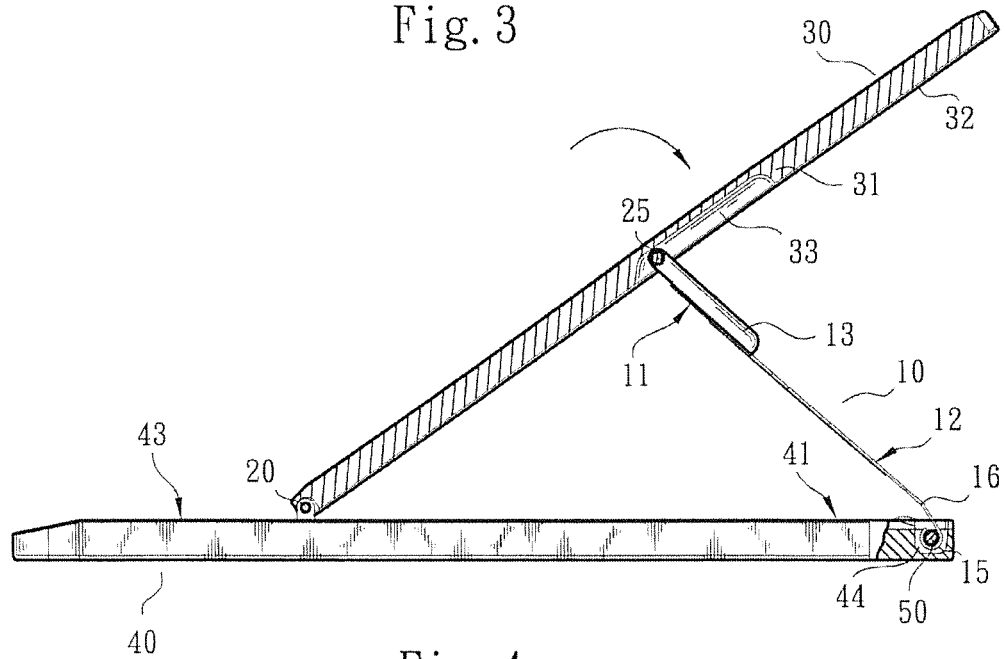
FIG. 4 is a schematic view of an operating embodiment of the present invention, wherein a movement condition of a pushed sliding and/or rotating module and a connecting arm is illustrated.

As illustrated in FIGS. 4 and 5, the sliding and/or rotating module 30 being downwardly pressed or pushed by the user is moved toward the starting point of the rail 42, and the first ends 11 and the second end 12 of the connecting arm 10 in response to the movement of the sliding and/or rotating module 30 are respectively rotated about the fastener 25 and the rotary shaft 50 which are served as pivots. In FIGS. 4 and 5, it also can be appreciated that the connecting portion 13 is gradually moved toward the slot compartment 33 of the sliding and/or rotating module 30 with respect to the rotation of the connecting arm 10.

It is understood that the connecting arm 10 is utilized to support and stabilize the sliding and/or rotating module 30 when the sliding and/or rotating module 30 is moved. That is, by incorporating with the supporting and stabilizing functions of the connecting arm 10, the sliding and/or rotating module 30 can be slantly adjusted to allow the user to perform touch-controlling functions on the sliding and/or rotating module 30.

Figure 7:
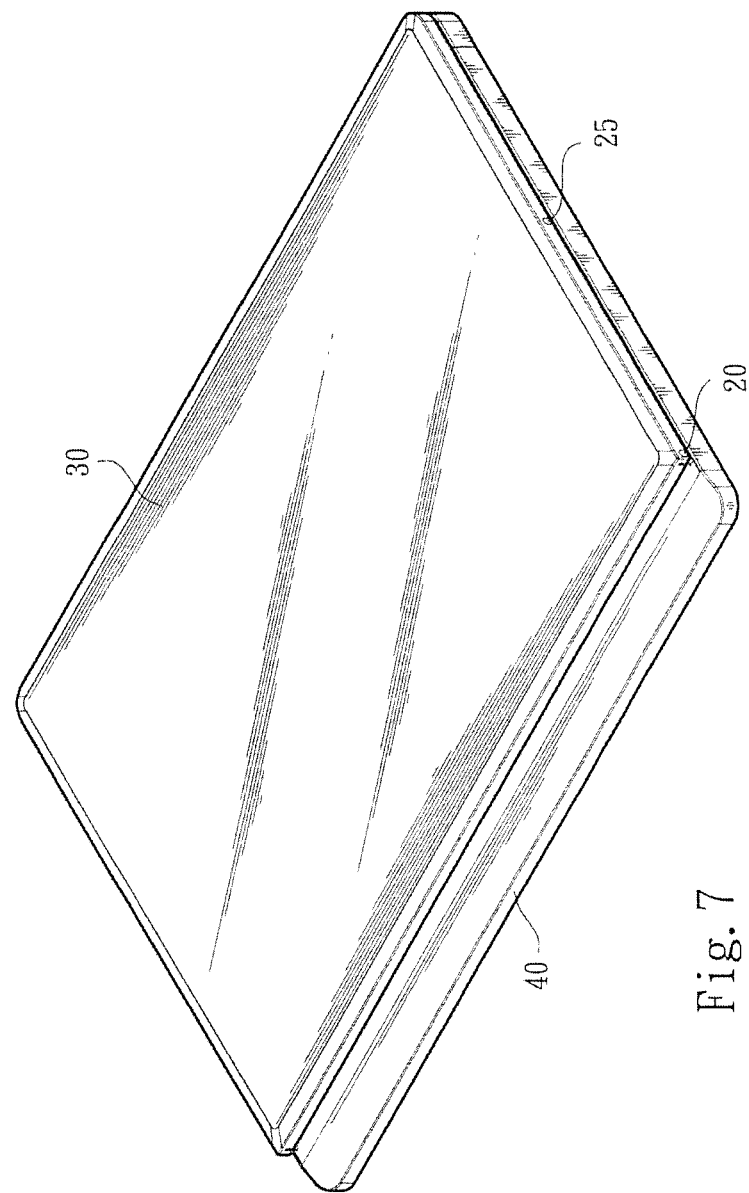
FIG. 7 is a schematic perspective view of the embodiment in FIG. 6.

Referring to FIGS. 6 and 7, when the pivotal shaft 20 is arrived at the starting point of the rail 42 in response to the pushed sliding and/or rotating module 30, the sliding and/or rotating module 30 is assembled to or covered on the substrate module 40, and the connecting portion 13 is received in the slot compartment 33 of the sliding and/or rotating module 30.

With the first and second ends 11 and 12 of the connecting arm 10 respectively pivoted to the side regions 31 of the sliding and/or rotating module 30 and the edge portion 41 of the substrate module 40, and further with the connecting arm 10 being rotated in response to the movement of the sliding and/or rotating module 30, it shall be noticed that the rotation or combination type can be provided between the first and second ends 11 and 12 of the connecting arm 10 and the side regions 31 of the sliding and/or rotating module 30 and the edge portion 41 of the substrate module 40.

Representatively speaking, the light and slim supporting structure for the electronic device of the present invention provides the following considerations ad advantages, compared to the conventional skills.

Firstly, under redesign and reconsideration, the present invention provides unique structures and operational conditions of the sliding and/or rotating module 30, the substrate module 40 and related components to distinguish from the conventional skills. For example, the sliding and/or rotating module 30 stably supported by the connecting arm 10 is capable of providing the user to perform touch-controlling functions. The present invention further provides the first and second ends 11 and 12 of the connecting arm 10 to be respectively pivoted to the side regions 31 of the sliding and/or rotating module 30 and the edge portion 41 of the substrate module 40 as well as the connecting portion 13 to be received in the slot compartment 33 of the sliding and/or rotating module 30, so that the large thickness or volume electronic device caused by the conventional pivotal-type supporting pivotal structure disposed between the back of the sliding-cover module and the substrate module can be reduced.

Secondly, the present invention provides excellent internal structure arrangement to improve the difficulties in conventional skills, such as the sliding-cover module and the substrate module commonly disposed in the concave compartment to influence the internal space utilization and arrangement of the conventional structure (especially for the components and parts taken large spaces and parts).

In conclusion, the supporting structure for the electronic device of the present invention provides excellent, unique space utilization and incomparable advantages different from the conventional skills.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A supporting structure for an electronic device, comprising:
    a connecting arm assembled to a sliding and/or rotating module having a side region and a substrate module having an edge portion, the connecting arm including a first end pivoted intermediately along the side region of the sliding and/or rotating module and a second end pivoted to the edge portion of the substrate module for fulcrum support of the sliding and/or rotating module in an open configuration of the electronic device;
    wherein the edge portion of the substrate module is provided with a concave compartment; two sides of the concave compartment of the substrate module are provided with slot pockets; and, the concave compartment and the slot pockets of the substrate module are enclosed by a cover provided with an opening through which the second end of the connecting arm is extended, the connecting arm collapsing to be captured between the sliding and/or rotating module and the substrate module in a closed configuration of the electronic device.

2. A supporting structure for the electronic device, comprising:
    a connecting arm assembled to a sliding and/or rotating module having a side region and a substrate module having an edge portion, the connecting arm including a first end and a second end;
    wherein the first end of the connecting arm is provided with a connecting portion pivoted intermediately along the side region of the sliding and/or rotating module for fulcrum support of the sliding and/or rotating module in an open configuration of the electronic device; the second end of the connecting arm is provided with a pivotal portion pivoted to the edge portion of the substrate module by a rotary shaft; the edge portion of the substrate module is provided with a concave compartment; two sides of the concave compartment of the substrate module are provided with slot pockets; and, the concave compartment and the slot pockets of the substrate module are enclosed by a cover provided with an opening through which the second end of the connecting arm is extended, the connecting arm collapsing to be captured between the sliding and/or rotating module and the substrate module in a closed configuration of the electronic device.

\* \* \* \* \*